United States Patent
Fujii et al.

(10) Patent No.: US 10,158,268 B2
(45) Date of Patent: Dec. 18, 2018

(54) BRUSHLESS DC MOTOR AND VENTILATION DEVICE HAVING SAME MOUNTED THEREIN

(71) Applicant: Panasonic Intellectual Property Management Co., Ltd., Osaka (JP)

(72) Inventors: Kenji Fujii, Aichi (JP); Toshihiro Matsumoto, Aichi (JP); Satoru Murao, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 310 days.

(21) Appl. No.: 14/916,331

(22) PCT Filed: Sep. 16, 2014

(86) PCT No.: PCT/JP2014/004748
§ 371 (c)(1),
(2) Date: Mar. 3, 2016

(87) PCT Pub. No.: WO2015/040852
PCT Pub. Date: Mar. 26, 2015

(65) Prior Publication Data
US 2016/0197530 A1    Jul. 7, 2016

(30) Foreign Application Priority Data

Sep. 17, 2013  (JP) .................................. 2013-191420
Sep. 19, 2013  (JP) .................................. 2013-193828
Sep. 26, 2013  (JP) .................................. 2013-199552

(51) Int. Cl.
*H02K 3/50*    (2006.01)
*H02K 11/33*   (2016.01)
(Continued)

(52) U.S. Cl.
CPC ........... *H02K 3/50* (2013.01); *F04D 25/0693* (2013.01); *F04D 25/088* (2013.01); *H02K 3/522* (2013.01);
(Continued)

(58) Field of Classification Search
CPC ............ H02K 3/50; H02K 3/52; H02K 3/522; H02K 5/22
(Continued)

(56) References Cited

U.S. PATENT DOCUMENTS 5,073,735 A * 12/1991 Takagi ..................... H02K 5/04
310/194
5,243,246 A *  9/1993 Sakamoto .............. H02K 3/522
310/179
(Continued)

FOREIGN PATENT DOCUMENTS

CN    1938564 A     3/2007
JP    5-074158 U   10/1993
(Continued)

OTHER PUBLICATIONS

International Search Report of PCT application No. PCT/JP2014/004748 dated Dec. 16, 2014.
(Continued)

*Primary Examiner* — Burton Mullins
(74) *Attorney, Agent, or Firm* — McDermott Will & Emery LLP

(57) ABSTRACT

Insulator that forms an insulating layer on a surface of a plurality of stacked stator cores includes protruding part extending from an outer circumference of stator cores on a substantially same face as one end face of stator cores in a stacking direction. Protruding part includes hooks that fixedly holds connector having a plurality of connector terminals for feeding power from outside. Connector is
(Continued)

fixedly held by hooks, winding is wound around each slot of stator cores via insulator, and connector terminals are fixedly press-fitted to connector. A tip of each of connector terminals on a side of winding is bent into a substantially L-shape, winding end in each phase of winding is directly tied to L-shaped tip of connector terminal and connected thereto by soldering.

6 Claims, 15 Drawing Sheets

(51) Int. Cl.
    *H02K 5/22*     (2006.01)
    *F04D 25/06*     (2006.01)
    *F04D 25/08*     (2006.01)
    *H02K 11/00*     (2016.01)
    *H02K 3/52*     (2006.01)

(52) U.S. Cl.
    CPC ......... *H02K 5/225* (2013.01); *H02K 11/0094* (2013.01); *H02K 11/33* (2016.01); *H02K 5/22* (2013.01); *H02K 2203/03* (2013.01)

(58) Field of Classification Search
    USPC .......................................................... 310/71
    See application file for complete search history.

(56) References Cited

U.S. PATENT DOCUMENTS

| | | | | |
|---|---|---|---|---|
| 5,629,574 | A * | 5/1997 | Cognetti | H02K 5/225 |
| | | | | 174/541 |
| 6,031,307 | A * | 2/2000 | Ohshita | H02K 3/50 |
| | | | | 29/735 |
| 6,404,083 | B1 * | 6/2002 | Muhrer | H02K 3/50 |
| | | | | 310/71 |
| 6,577,031 | B2 * | 6/2003 | Morooka | H02K 5/08 |
| | | | | 310/177 |
| 6,750,577 | B2 * | 6/2004 | Mimura | G01D 11/30 |
| | | | | 310/67 R |
| 6,975,052 | B2 * | 12/2005 | Uchida | H02K 3/522 |
| | | | | 310/71 |
| 7,159,296 | B2 * | 1/2007 | Miya | H02K 15/0056 |
| | | | | 242/432.6 |
| 7,356,910 | B2 * | 4/2008 | Akutsu | G01D 5/2046 |
| | | | | 29/602.1 |
| 7,430,796 | B2 * | 10/2008 | Baumgartner | H02K 3/522 |
| | | | | 29/596 |
| 7,588,444 | B2 * | 9/2009 | Kataoka | H02K 3/50 |
| | | | | 439/76.2 |
| 7,696,660 | B2 * | 4/2010 | Koike | H01R 12/515 |
| | | | | 310/179 |
| 7,755,231 | B2 * | 7/2010 | Kataoka | G01D 5/2013 |
| | | | | 29/596 |
| 7,868,496 | B2 * | 1/2011 | Fujii | H02K 3/522 |
| | | | | 310/179 |
| 7,893,578 | B2 * | 2/2011 | Hayashi | H02K 3/522 |
| | | | | 310/156.05 |
| 8,040,004 | B2 * | 10/2011 | Oda | H02K 5/225 |
| | | | | 310/68 B |
| 8,198,767 | B2 * | 6/2012 | Migita | H02K 3/522 |
| | | | | 310/68 R |
| 8,410,649 | B2 * | 4/2013 | Tanabe | H01R 12/707 |
| | | | | 310/71 |
| 8,963,389 | B2 * | 2/2015 | Kim | H02K 3/522 |
| | | | | 310/71 |
| 2004/0149355 | A1 * | 8/2004 | Kohno | C21D 8/12 |
| | | | | 148/111 |
| 2008/0036315 | A1 | 2/2008 | Makiuchi et al. | |

FOREIGN PATENT DOCUMENTS

| | | |
|---|---|---|
| JP | 6-351184 | 12/1994 |
| JP | 10-201160 | 7/1998 |
| JP | 2002-359944 | 12/2002 |
| JP | 2008-141903 | 6/2008 |

OTHER PUBLICATIONS

English Translation of Chinese Search Report dated Dec. 20, 2017 for the related Chinese Patent Application No. 201480051310.4.

* cited by examiner

BRUSHLESS DC MOTOR AND VENTILATION DEVICE HAVING SAME MOUNTED THEREIN

This application is a U.S. national stage application of the PCT international application No. PCT/JP2014/004748.

TECHNICAL FIELD

The present invention relates to a fan-driving brushless DC motor and a ventilation device having the brushless DC motor mounted therein, for example, ceiling-mounted exhaust and intake ventilators, air blowers, humidifiers, dehumidifiers, refrigerators, air conditioners, and water heaters.

BACKGROUND ART

To reduce power consumption, ventilation devices mounted in electrical devices such as ventilators have increasingly adopted a brushless DC motor. The brushless DC motor is classified into two types, i.e., the motor including a driving circuit board, and the motor driven by an external circuit without including the driving circuit board.

The motor including the driving circuit board can be driven merely by feeding power to the motor, which is convenient, but becomes complex in structure. Moreover, in the case where the device includes a control circuit board other than the driving circuit board in the motor, the two circuit boards are present in the device.

The motor that does not include the driving circuit board has a simple structure, but requires a separate driving circuit. However, in the case where the device has another control circuit board, the motor driving circuit can be mounted on the control circuit board so that the circuit boards in the device are unified into one circuit board.

The conventional brushless DC motor including this type of driving circuit board is configured as follows (refer to PTL 1, for example).

The conventional brushless DC motor will be described below with reference to FIG. 16 and FIG. 17.

As illustrated in a stator structure in FIG. 16, a stator includes a plurality of stacked stator cores 101, insulator 102 forming an insulating layer on a surface of stator cores 101, and outer peripheral holes 106 for vertically receiving terminal pins formed on insulator 102 on an outer circumference of stator cores 101. Insulator 102 on the outer circumference of stator cores 101 has board holders 108a, 108b for holding driving circuit board 107 (FIG. 17). These components constitute the stator.

As illustrated in FIG. 17, in the conventional brushless DC motor, winding wound via insulator 102 is connected to terminal pin 110 vertically received in outer peripheral hole 106, and terminal pin 110 is connected to driving circuit board 107 held by board holders 108a, 108b. Then, in the state where driving circuit board 107 is connected to connector terminal 109 of connector 103 held on driving circuit board 107, the stator is coated with mold resin 105 to form an outer package of the motor. Subsequently, rotor 104, shaft 111, and bearings 112a, 112b, which are integrated, are placed in the outer package of the motor, and are covered with bracket 113.

CITATION LIST

Patent Literature

PTL 1: Unexamined Japanese Patent Publication No. 2008-141903

SUMMARY OF THE INVENTION

In such a conventional brushless DC motor including driving circuit board 107, connection of terminal pin 110, holding of connector 103, and connection of connector terminal 109 are achieved by incorporating driving circuit board 107. For this reason, when it is attempted to achieve a brushless DC motor that does not include driving circuit board 107, disadvantageously, a board such as a wiring board is required.

The present invention provides a brushless DC motor that does not include a driving circuit board, and has a stator structure that does not require a board such as a wiring board.

The brushless DC motor of the present invention includes a plurality of stacked stator cores, and an insulator configured to form an insulating layer on a surface of the stator cores and to have a protruding part extending from an outer circumference of the stator cores on a substantially same face as one end face of the stator cores in a stacking direction. The brushless DC motor further includes winding wound around the stator cores via the insulator, and a connector configured to have a plurality of connector terminals that feed power from outside, and to be fixedly held by the protruding part. Ends of the winding are connected to the plurality of connector terminals.

In this manner, the winding ends are directly connected to the connector terminals, enabling feeding of power to the motor without using a wiring board.

Accordingly, a brushless DC motor with a simple configuration having a small number of parts, and a ventilation device having such a brushless DC motor mounted therein can be achieved.

DESCRIPTION OF EMBODIMENTS

Exemplary embodiments of the present invention will be described below with reference to the drawings.

First Exemplary Embodiment

Figure 1:
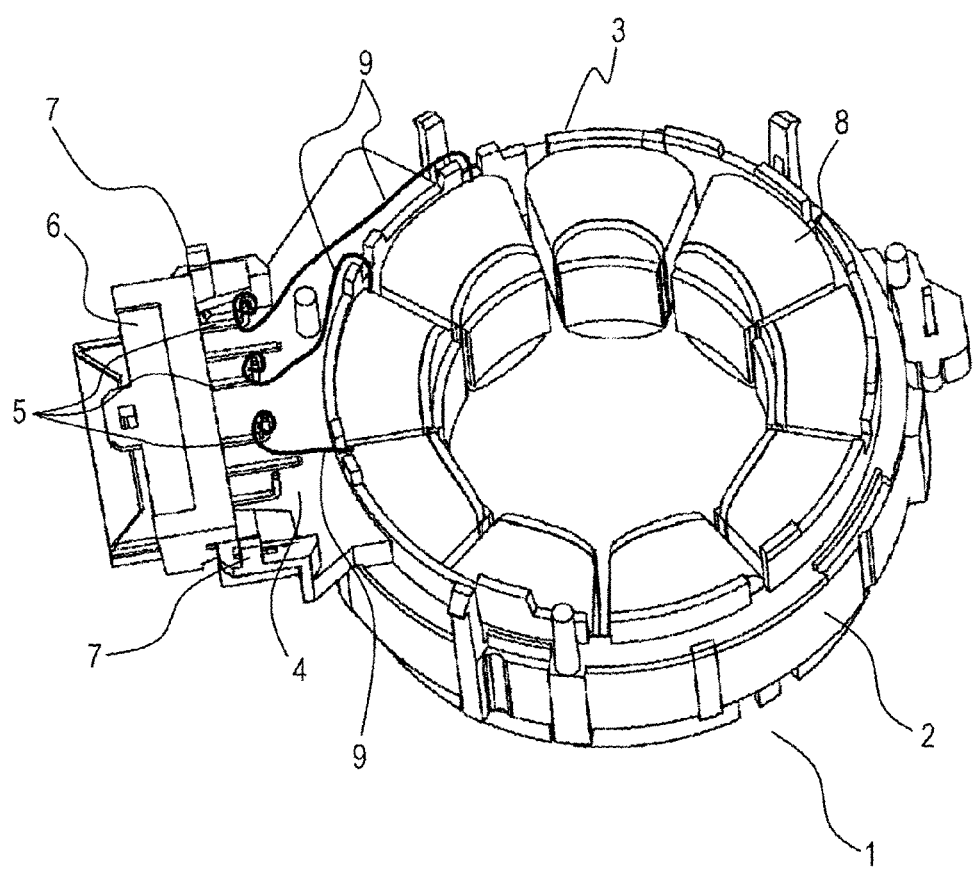
FIG. 1 is a schematic perspective view illustrating a stator of a brushless DC motor according to a first exemplary embodiment of the present invention.
Figure 2:
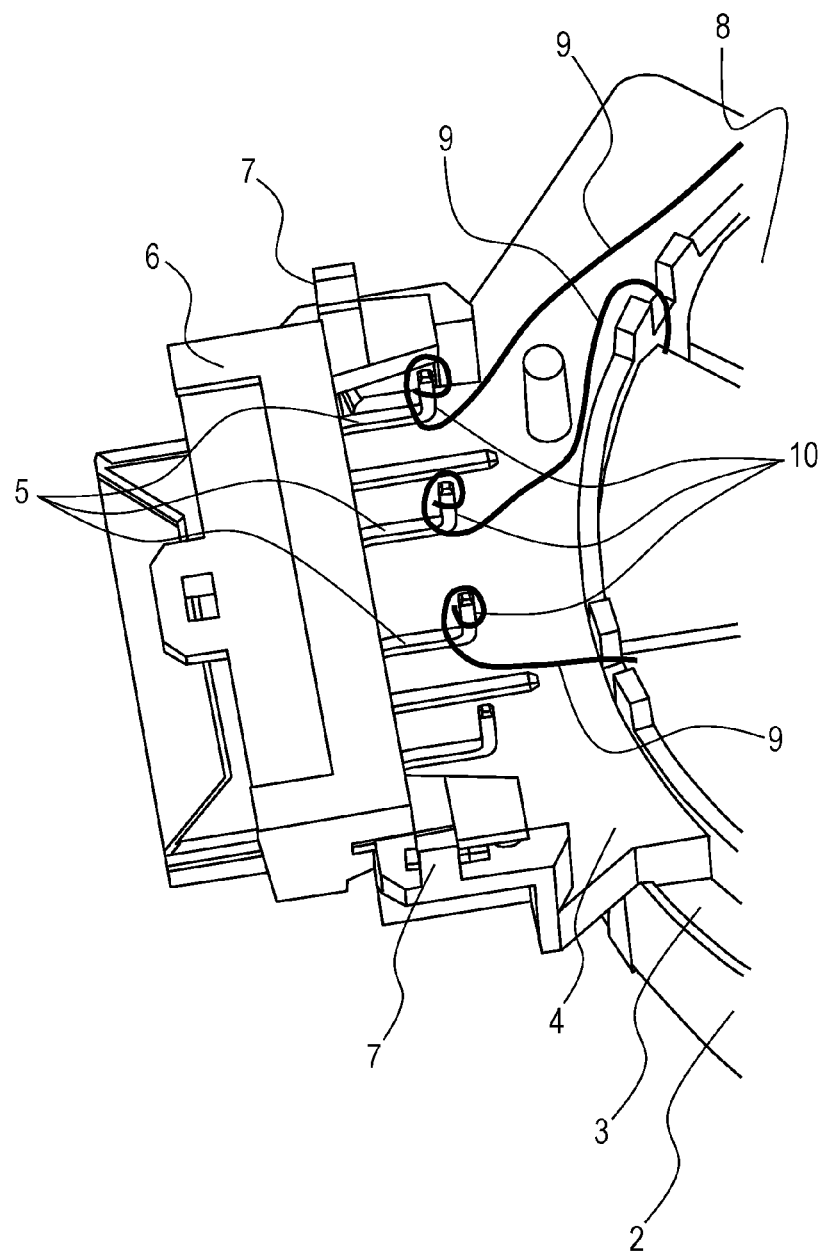
FIG. 2 is an enlarged perspective view illustrating a main part of the stator of the brushless DC motor according to the first exemplary embodiment of the present invention.
Figure 3:
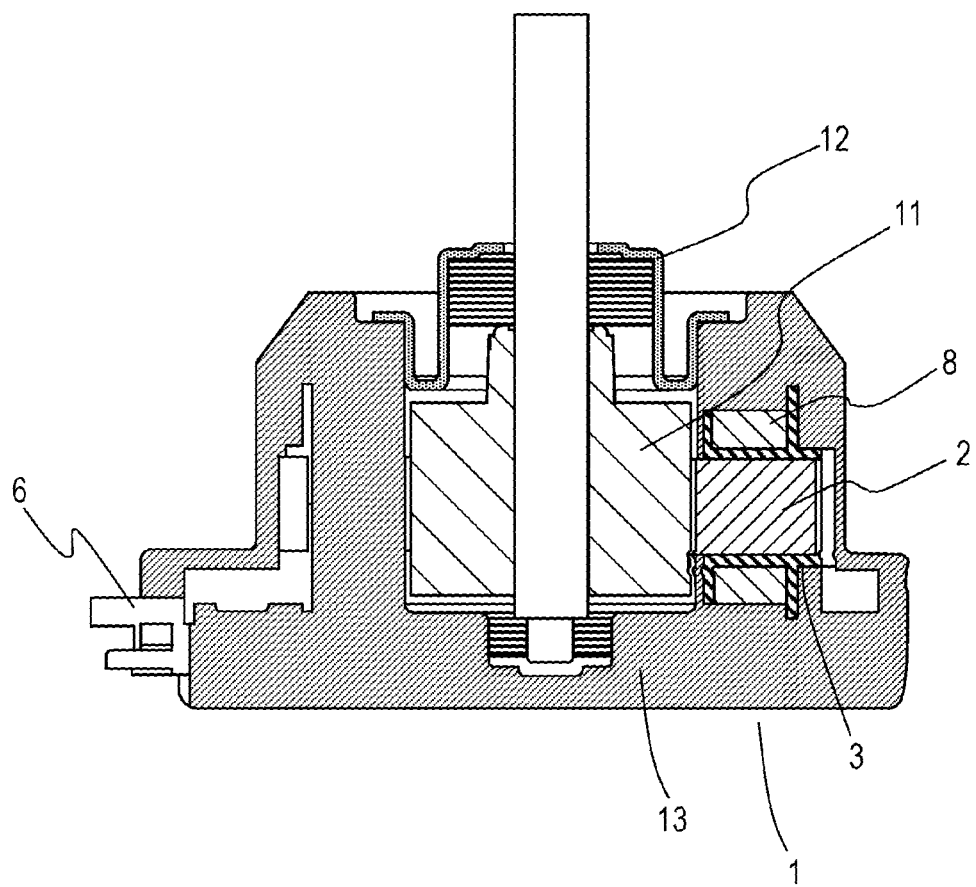
FIG. 3 is a schematic sectional view illustrating the brushless DC motor according to the first exemplary embodiment of the present invention.

FIG. 1 to FIG. 3 illustrate a brushless DC motor according to a first exemplary embodiment of the present invention.

Stator 1 of the brushless DC motor in this exemplary embodiment includes a plurality of stacked stator cores 2, and insulator 3 forming an insulating layer on the surface of stator cores 2. Insulator 3 includes protruding part 4 extending from an outer circumference of stator cores 2 on the substantially same face as one end face of stator cores 2 in a stacking direction.

Protruding part 4 is provided with hooks 7 for fixedly holding connector 6 having a plurality of (6 in this exemplary embodiment) connector terminals 5 to feed power from the outside. Connector 6 is fixedly held by hooks 7. Winding 8 is wound around each slot of stator cores 2 via insulator 3.

Connector terminals 5 are fixedly press-fit into connector 6. As illustrated in FIGS. 1 and 2, in this exemplary embodiment, 4 out of 6 connector terminals 5 on the side of winding 8 are bent into a substantially L-like shape away from the protruding part 4. In this state, winding end 9 in each phase of winding 8 (three-phase winding in this exemplary embodiment) is directly tied to L-shaped tip 10 of corresponding connector terminal 5. Then, L-shaped tips 10 of connector terminals 5 are electrically and mechanically connected to respective winding ends 9 by soldering (not illustrated) or the like. In this exemplary embodiment, 4 out of 6 connector terminals 5 are bent into an L-shape. Because of the three-phase winding, 3 connector terminals 5 may be bent into the L-shape. Further, by disposing an unbent connector terminal 5 between the adjacent L-shaped connector terminals 5, larger space for tying the winding can be ensured, preventing contact of winding.

As illustrated in FIG. 3, stator 1 is integrally molded and solidified using resin 13 that constitutes an outer package, and is provided with rotor 11 having a magnet and bracket 12 to form brushless DC motor 17.

Brushless DC motor 17 without a driving circuit thus configured in this exemplary embodiment is connected to an external power driving circuit (not illustrated) by means of connector 6, enabling a sensorless brushless DC motor that feeds power from the driving circuit from connector terminals 5 to winding 8 to control rotation.

The sensorless brushless DC motor in this exemplary embodiment is characterized by the way of connecting winding ends 9 of winding 8 to respective connector terminals 5. Winding ends 9 are directly tied to upwardly-bent L-shaped tips 10 of connector terminals 5.

That is, hooks 7 of protruding part 4 of insulator 3 fixedly hold connector 6, and connector terminals 5 are fixedly press-fitted to connector 6. Thus, as connector terminals 5 are strongly held by insulator 3, winding ends 9 can be strongly tied to respective connector terminals 5. This ensures reliable connection of winding 8 without looseness and slack. As a result, brushless DC motor 17 having the stator structure that does not require a board such as a wiring board can be provided.

Figure 7A:
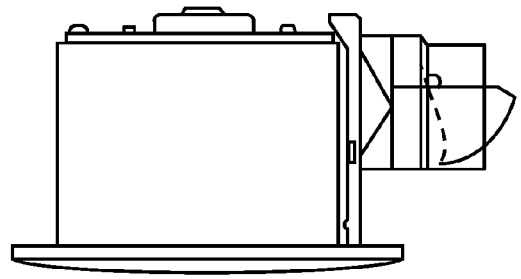
FIG. 7A is a front view illustrating a ventilation device having the brushless DC motor mounted therein according to an exemplary embodiment of the present invention.
Figure 7B:
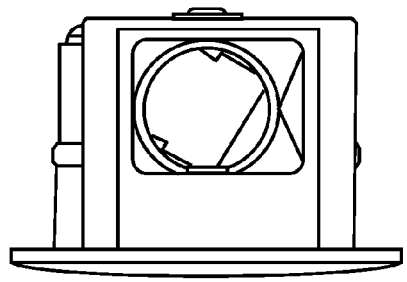
FIG. 7B is a side view illustrating the ventilation device having the brushless DC motor mounted therein according to the exemplary embodiment of the present invention.
Figure 7C:
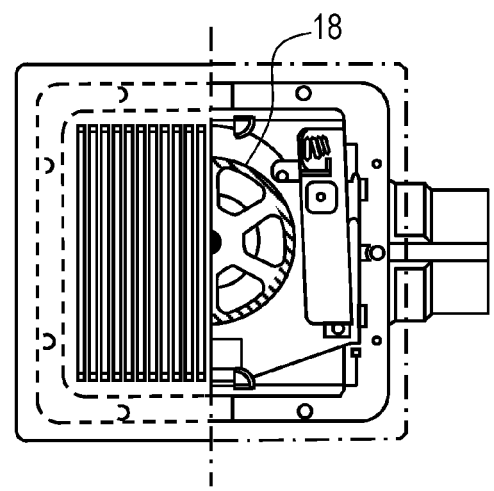
FIG. 7C is a partially cutout bottom view illustrating the ventilation device having the brushless DC motor mounted therein according to the exemplary embodiment of the present invention.

FIG. 7A, FIG. 7B, and FIG. 7C illustrate a ventilation device having the brushless DC motor mounted therein in this exemplary embodiment, and ventilation fan 18 is connected to the brushless DC motor in this exemplary embodiment. That is, the brushless DC motor with a simple configuration having a small number of parts, and the ventilation device having such a motor mounted therein enable cost reduction.

Second Exemplary Embodiment

Figure 4:
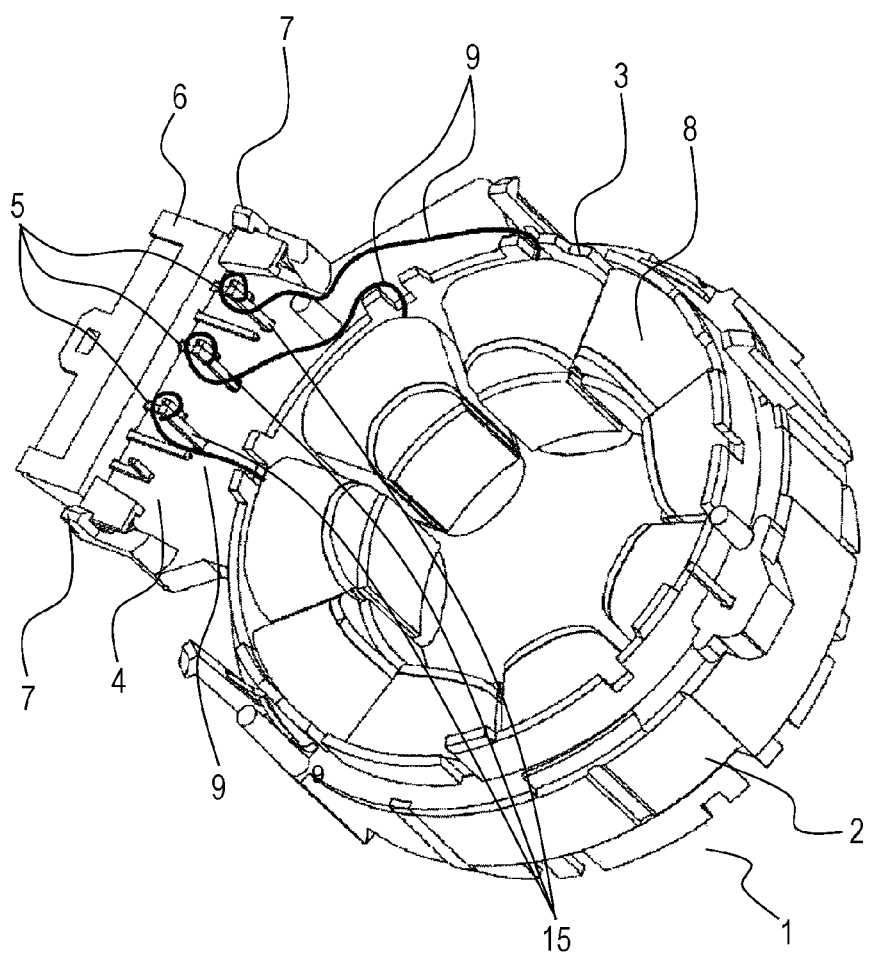
FIG. 4 is a schematic perspective view illustrating a stator of a brushless DC motor according to a second exemplary embodiment of the present invention.
Figure 5:
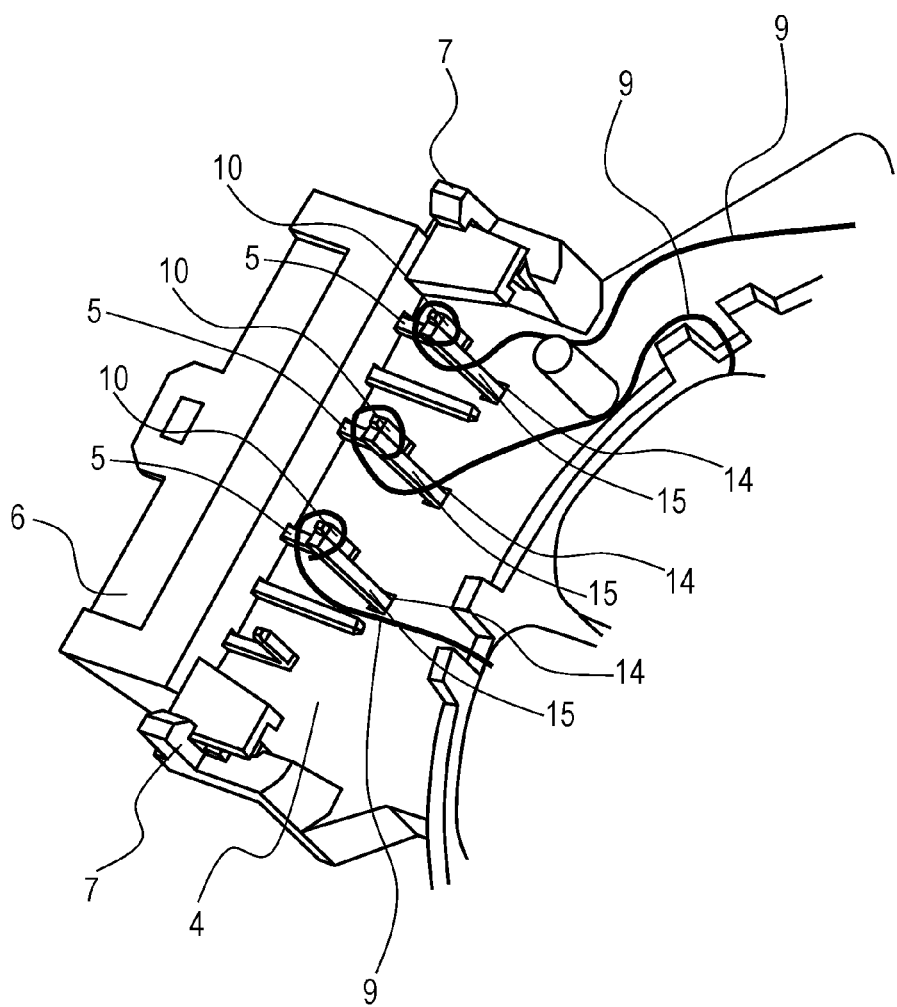
FIG. 5 is an enlarged perspective view illustrating a main part of the stator of the brushless DC motor according to the second exemplary embodiment of the present invention.
Figure 6:
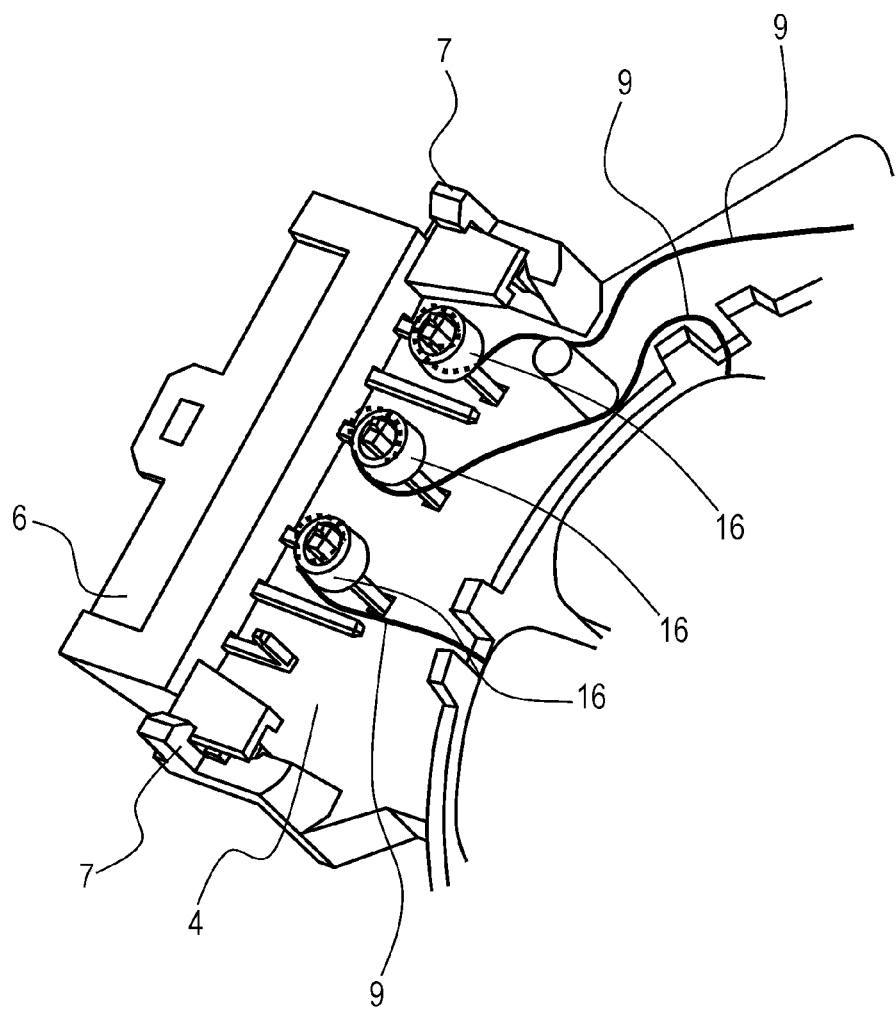
FIG. 6 is an enlarged perspective view illustrating a main part of a reinforcing member of the stator of the brushless DC motor according to the second exemplary embodiment of the present invention.

FIG. 4 to FIG. 6 illustrate a brushless DC motor according to a second exemplary embodiment of the present invention. The parts having the same configuration as those of the brushless DC motor in the first exemplary embodiment of the present invention are given the same reference numerals, and detailed description thereof is omitted.

As illustrated in FIG. 4 to FIG. 6, terminal pins 15 are inserted into respective terminal pin holes 14 in protruding part 4 of insulator 3. Each of terminal pins 15 is disposed substantially parallel to and adjacent to L-shaped tip 10 of connector terminal 5. In the state where L-shaped tips 10 of connector terminals 5 are in contact with respective terminal pins 15, winding end 9 in each phase of winding 8 is tied to both L-shaped tip 10 and terminal pin 15. Then, L-shaped tips 10 of connector terminals 5 are electrically and mechanically connected to respective winding ends 9 by soldering (not illustrated) or the like.

The brushless DC motor in this exemplary embodiment is characterized by the way of connecting winding ends 9 of winding 8 to respective connector terminals 5 and terminal pins 15. Each L-shaped tip 10 of connector terminal 5 is directly brought into contact with terminal pin 15, and both L-shaped tip 10 and terminal pin 15 are simultaneously tied to winding end 9.

That is, hooks 7 of protruding part 4 of insulator 3 fixedly hold connector 6, and connector terminals 5 are fixedly press-fitted to connector 6. Thus, as connector terminals 5 are strongly held by insulator 3, even when winding ends 9 are directly tied to respective connector terminals 5, reliable connection can be achieved without looseness and slack of connector terminals 5 and winding ends 9. Further, by bringing each connector terminal 5 into contact with terminal pin 15 and tying connector terminal 5 and terminal pin 15 to winding end 9 simultaneously, the strength of the tied section is increased, whereby reliability is further improved. As a result, a brushless DC motor having the stator that does not require a board such as a wiring board can be provided.

As illustrated in FIG. 6, winding end 9 in each phase of winding 8 may be tied to both L-shaped tip 10 of connector terminal 5 and terminal pin 15 with L-shaped tip 10 and terminal pin 15 in contact with each other, and the tied section may be covered with small metallic sleeve 16 as a reinforcing member. Then, L-shaped tips 10 of connector terminals 5 are electrically and mechanically connected to respective winding ends 9 by soldering (not illustrated) or the like.

Covering of sleeve 16 as the reinforcing member increases the strength of the tied section, further improving reliability.

As a result, a brushless DC motor having the stator that does not requires a board such as a wiring board can be provided.

Third Exemplary Embodiment

FIG. 8 to FIG. 11 illustrate a brushless DC motor according to a third exemplary embodiment of the present invention.

Figure 8:
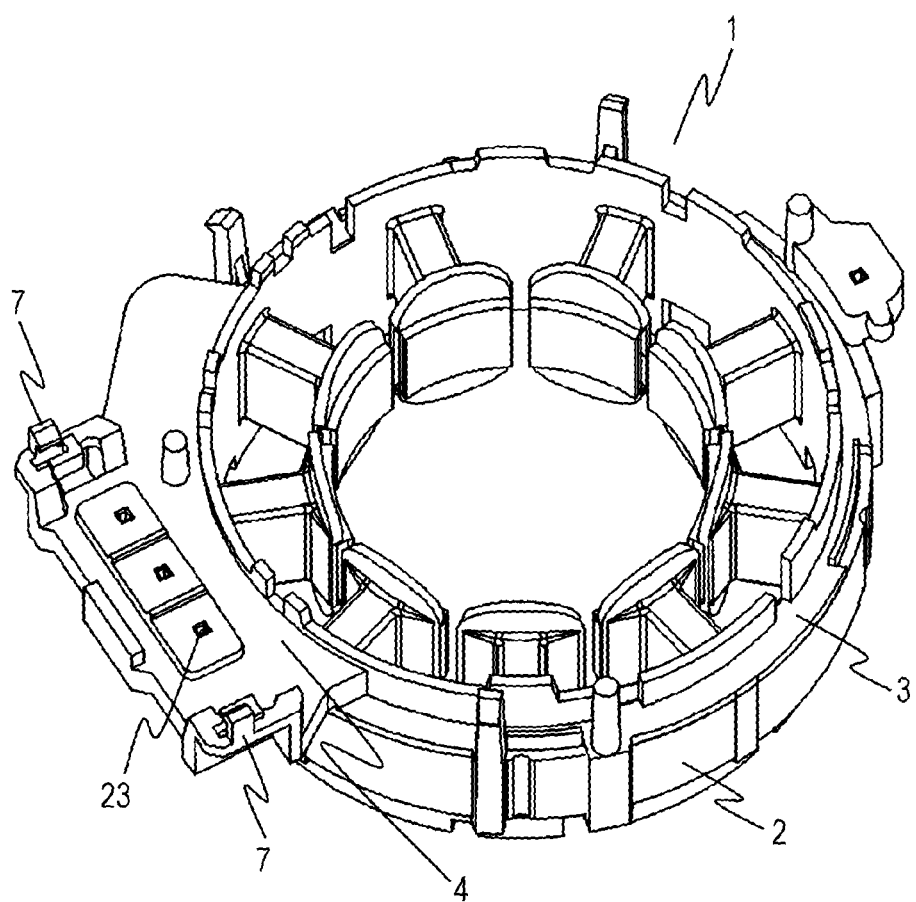
FIG. 8 is a schematic perspective view illustrating a stator of a brushless DC motor according to a third exemplary embodiment of the present invention.

As illustrated in FIG. 8, stator 1 of the brushless DC motor according to the third exemplary embodiment of the present invention includes a plurality of stacked stator cores 2, and insulator 3 configured to form an insulating layer on the surface of stator cores 2 and to have protruding part 4 extending from an outer circumference of stator cores 2 on the substantially same face as one end face of stator cores 2 in a stacking direction. Stator 1 further includes hooks 7 that are connector holders of protruding part 4, and connector-neighboring holes 23 for vertically providing three terminal pins 22 (FIG. 9, FIG. 10) between hooks 7 of insulator 3.

Figure 9:
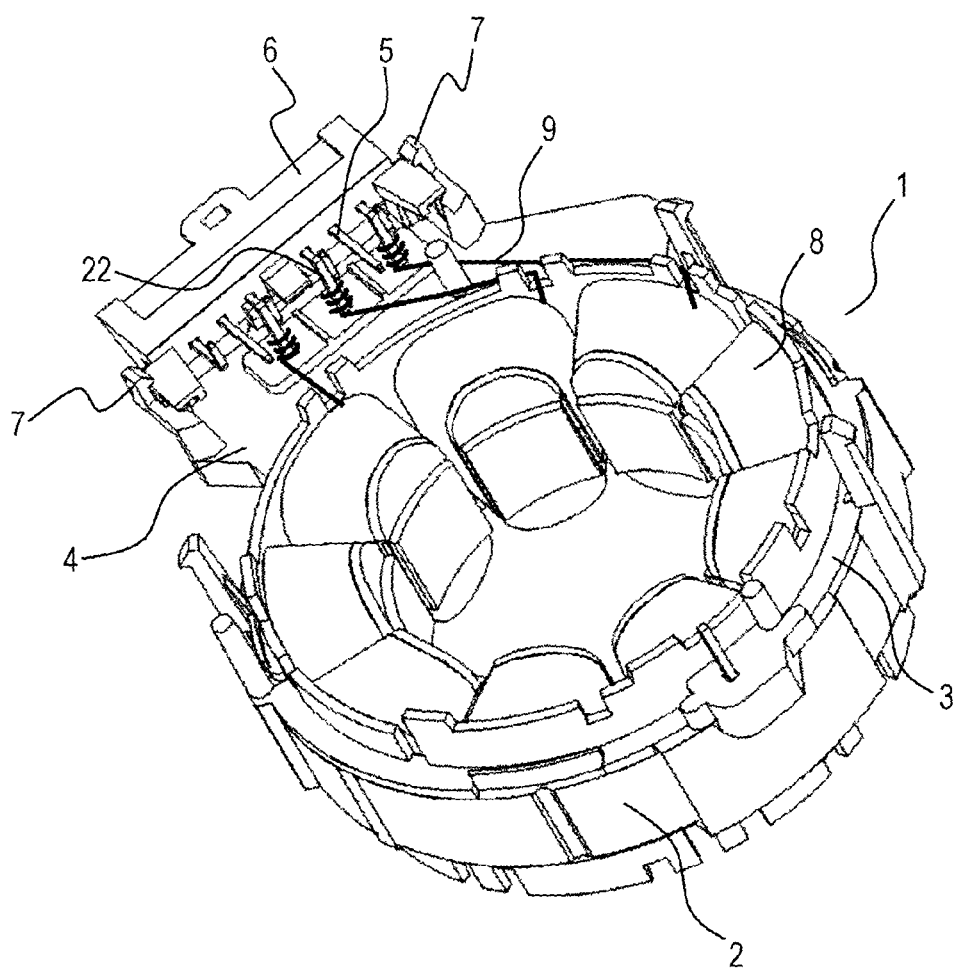
FIG. 9 is a schematic perspective view illustrating the stator of the brushless DC motor according to the third exemplary embodiment of the present invention.
Figure 10:
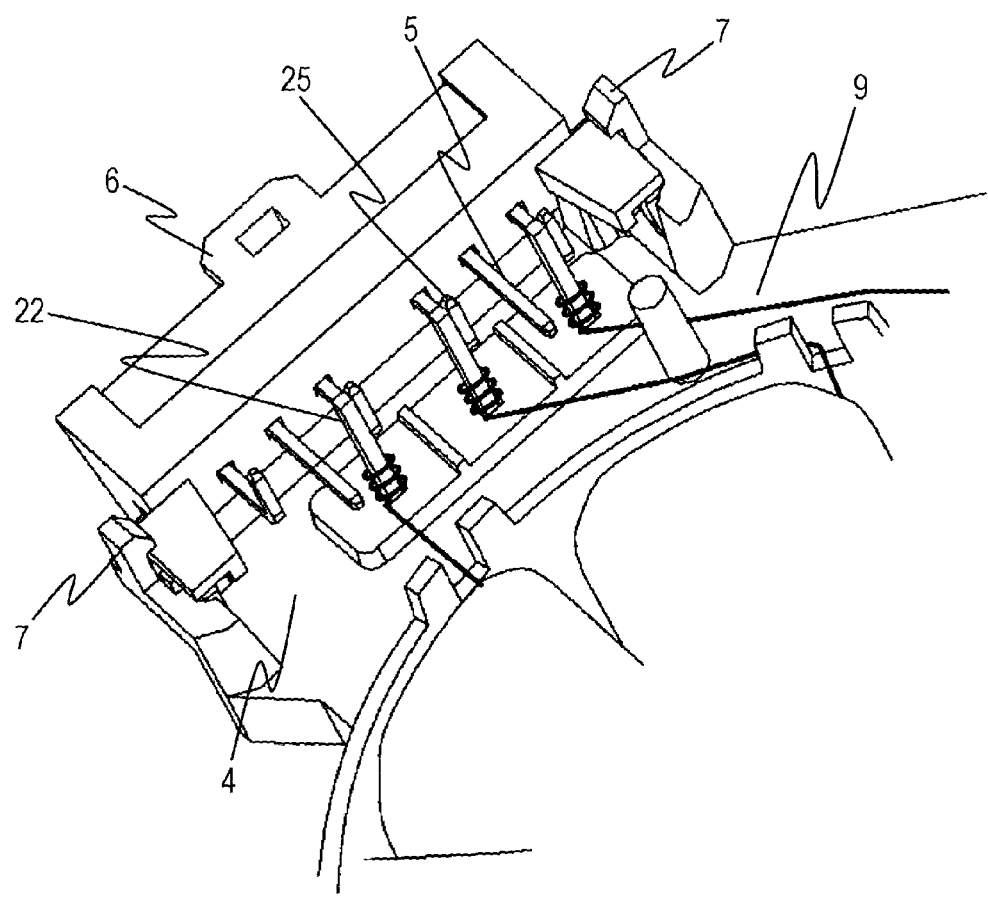
FIG. 10 is an enlarged perspective view illustrating a main part of the stator of the brushless DC motor according to the third exemplary embodiment of the present invention.

As illustrated in FIG. 9, three terminal pins 22 are vertically received in connector-neighboring holes 23, and three-phase winding ends 9 are tied to lower portions (near protruding part 4 of insulator 3) of terminal pins 22 by soldering. Then, connector 6 is attached to hooks 7. Connector terminals 5 are fixedly press-fitted to connector 6. However, as illustrated in FIGS. 9 and 10, in this exemplary embodiment, 4 out of 6 connector terminals 5 are bent at their ends on the side of winding 8 into an L-shape away from protruding part 4.

Here, each of terminal pins 22 is substantially parallel to and adjacent to L-shaped tips 25 of corresponding connector terminal 5. In this state, connector terminal 5 is connected to an upper portion of terminal pin 22 by soldering. Then, as in the brushless DC motor in first exemplary embodiment of the present invention as shown in FIG. 3, stator 1 is integrally molded and solidified using resin 13 that constitutes an outer package, and is provided with rotor 11 having a magnet and bracket 12 to form brushless DC motor 17.

Brushless DC motor 17 not including a driving circuit thus configured in this exemplary embodiment is connected to an external driving circuit (not illustrated) by means of connector 6, enabling a sensorless brushless DC motor that feeds power from the driving circuit from connector terminals 5 to winding 8 to control rotation.

The brushless DC motor in this exemplary embodiment is characterized by the way of connecting terminal pins 22 to respective connector terminals 5. Terminal pins 22 are brought into contact with upwardly-bent L-shaped tips 25 of respective connector terminals 5, and directly connected together by soldering.

Accordingly, brushless DC motor 17 having a stator structure that does not require a board such as a wiring board can be provided.

As illustrated in FIG. 7A, FIG. 7B, FIG. 7C, the brushless DC motor in this exemplary embodiment can be attached to ventilation fan 18. That is, the brushless DC motor having the stator structure that does not require a board such as a wiring board in this exemplary embodiment can be produced at lower costs and therefore, a ventilation device having the brushless DC motor mounted therein can be also produced at lower costs.

Figure 11:
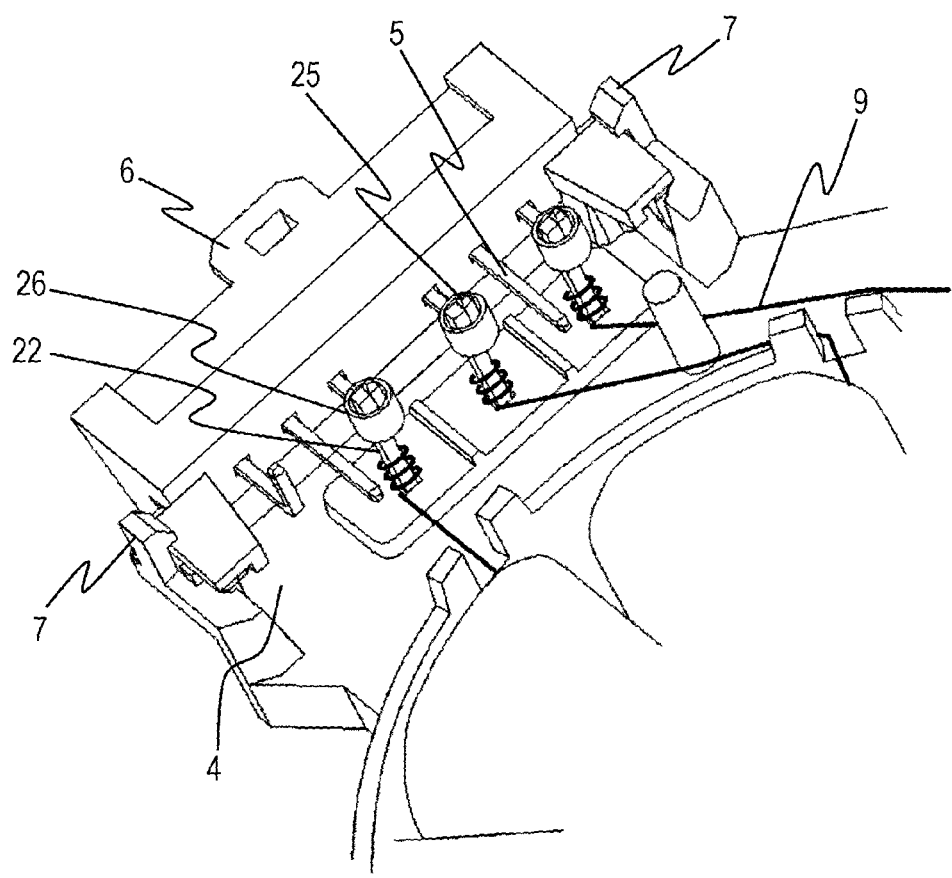
FIG. 11 is an enlarged perspective view illustrating a main part of a reinforcing member of the stator of the brushless DC motor according to the third exemplary embodiment of the present invention.

As illustrated in FIG. 11, L-shaped tip 25 of connector terminal 5 and terminal pin 22 may be brought into contact with each other and then, may be covered with a reinforcing member. After covering of metallic sleeve 26 as the reinforcing member, L-shaped tip 25 of connector terminal 5 is electrically and mechanically connected to terminal pin 22 by soldering (not illustrated) or the like.

Covering of sleeve 26 as the reinforcing member increases the mechanical strength of the soldered portion, and also improves the reliability of electrical connection.

In this exemplary embodiment, 4 out of 6 connector terminals 5 are bent at their ends on the side of winding 8 into an L-shape away from protruding part 4. However, connector terminals 5 are not necessarily bent into the L-shape. However, in this case, since the contact area between unbent connector terminal 5 and terminal pin 22 becomes smaller, the area electrically connected by soldering also becomes smaller, and the mechanical strength of the soldered portion and the reliability of electrical connection are lowered. Therefore, connector terminals 5 are preferably bent into the L-shape.

The pitch of connector terminals 5 is not necessarily an integral multiple of a minimum distance between adjacent terminal pins 22. However, in this case, since the direction in which terminal pin 22 is adjacent to connector terminal 5 is partially reversed, it is hard to find an assembling failure related to this direction in the connector assembling operation. Further, the distance between the soldered portions may be small, possibly leading to a failure in the soldering operation. Therefore, the pitch of connector terminals 5 is preferably an integral multiple of a minimum distance between adjacent terminal pins 22.

Fourth Exemplary Embodiment

FIG. 12 to FIG. 15 illustrate a brushless DC motor according to a fourth exemplary embodiment of the present invention.

Figure 12:
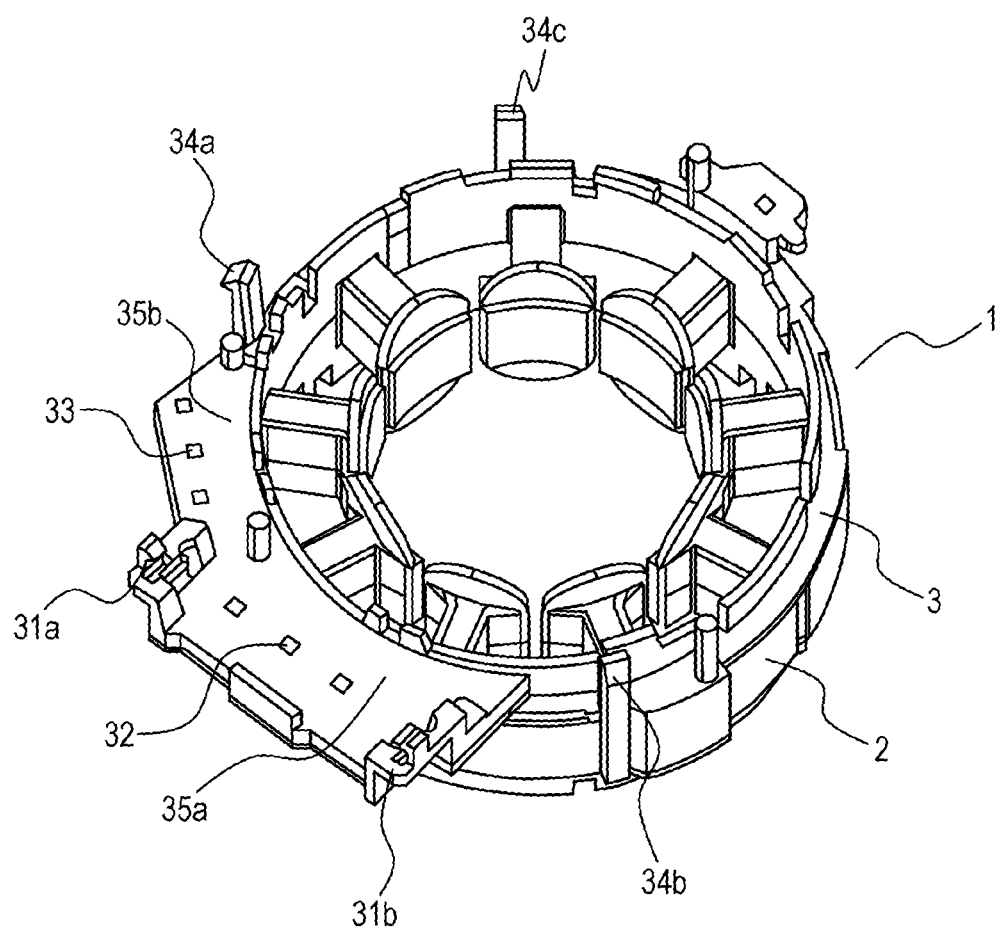
FIG. 12 is a schematic perspective view illustrating a stator of a brushless DC motor according to a fourth exemplary embodiment of the present invention.

As illustrated in FIG. 12, stator 1 of the brushless DC motor according to the fourth exemplary embodiment of the present invention includes a plurality of stacked stator cores 2, and insulator 3 configured to form an insulating layer on the surface of stator cores 2 and to have two protruding parts 35a, 35b with different sizes, the protruding parts 35a, 35b extending from an outer circumference of stator cores 2 on the substantially same face as one end face of stator cores 2 in a stacking direction. Stator 1 includes connector holders 31a, 31b on large protruding part 35a, and connector-neighboring holes 32 for vertically receiving three terminal pins 22 between connector holders 31a, 31b of insulator 3. Stator 1 further includes outer peripheral holes 33 for vertically receiving three terminal pins 22 near connector holder 31a in small protruding part 35b. To hold driving circuit board 36 (FIG. 13), stator 1 further includes three board holders 34a, 34b, 34c on insulator 3 on the outer circumference of stator cores 2 at regular intervals so as to protrude in the stacking direction of stator cores 2, the board holders each having a hooked tip.

Figure 13:
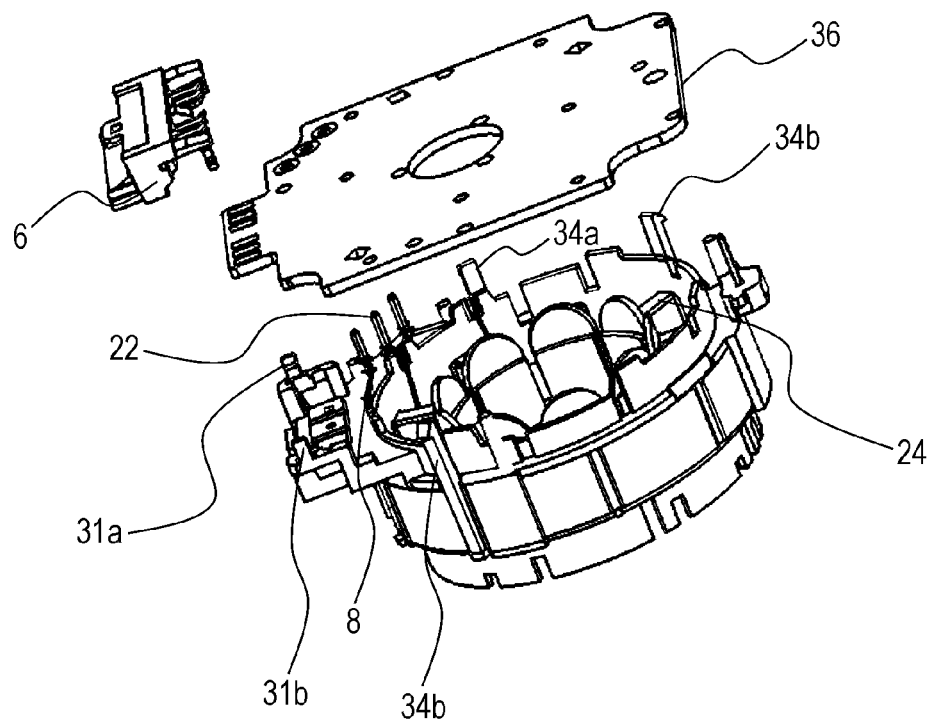
FIG. 13 is an assembly view illustrating a configuration of the stator of a brushless DC motor including a driving circuit board according to a fourth exemplary embodiment of the present invention.

In the case where the brushless DC motor includes driving circuit board 36, as illustrated in FIG. 13, three terminal pins 22 are vertically received in outer peripheral holes 33 illustrated in FIG. 12, and three-phase winding 8 is tied to lower portions (near protruding part 35b of insulator 3) of terminal pins 22 by soldering. Then, driving circuit board 36 is attached to board holders 34a, 34b, 34c, and the hooked tips of board holders 34a, 34b, 34c prevent slip-off of driving circuit board 36. Connector 6 is attached to connector holders 31a, 31b.

Figure 14:
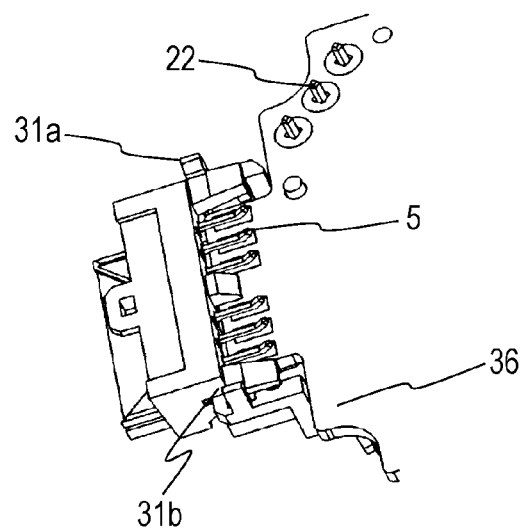
FIG. 14 is a schematic perspective view illustrating a connector of the brushless DC motor including the driving circuit board according to the fourth exemplary embodiment of the present invention.
Figure 15:
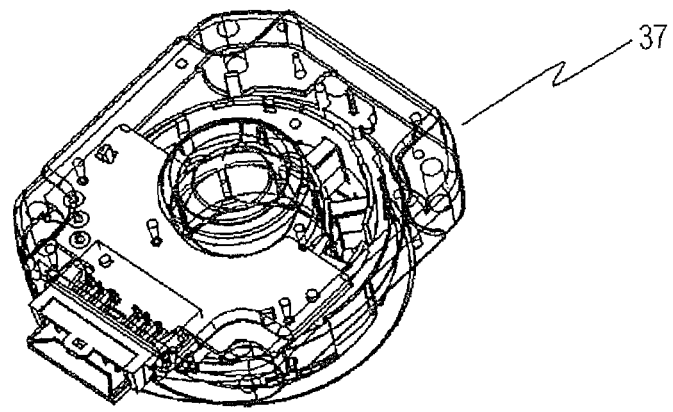
FIG. 15 is a perspective view illustrating a configuration of the brushless DC motor including the driving circuit board according to the fourth exemplary embodiment of the present invention.
Figure 16:
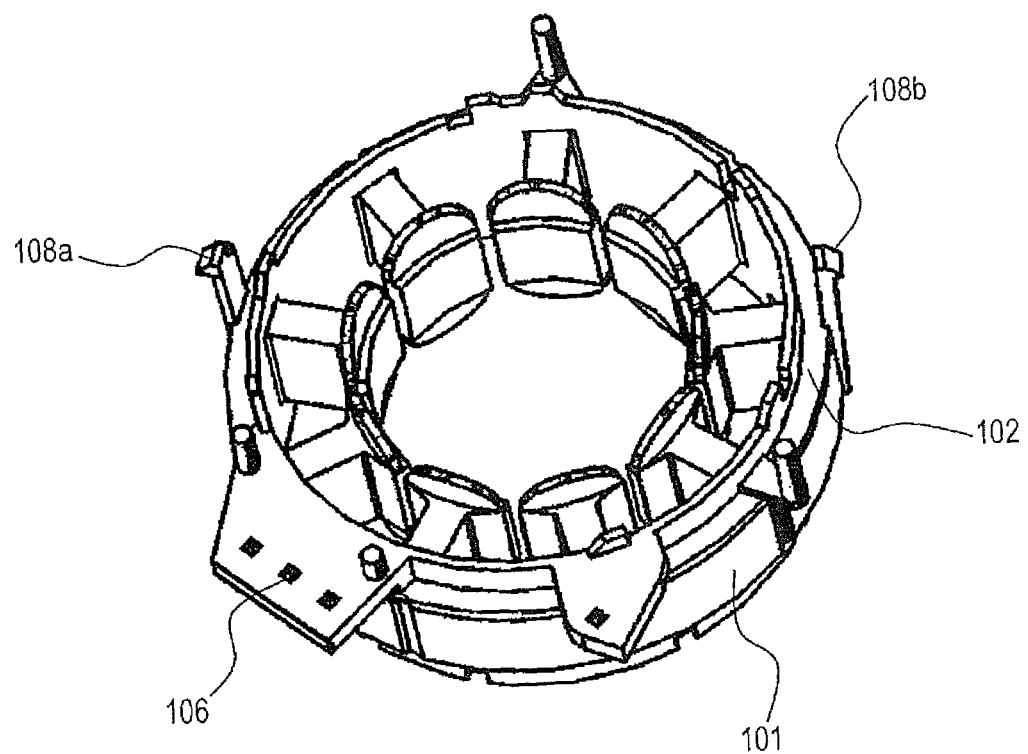
FIG. 16 is a schematic perspective view illustrating a stator of a conventional brushless DC motor.
Figure 17:
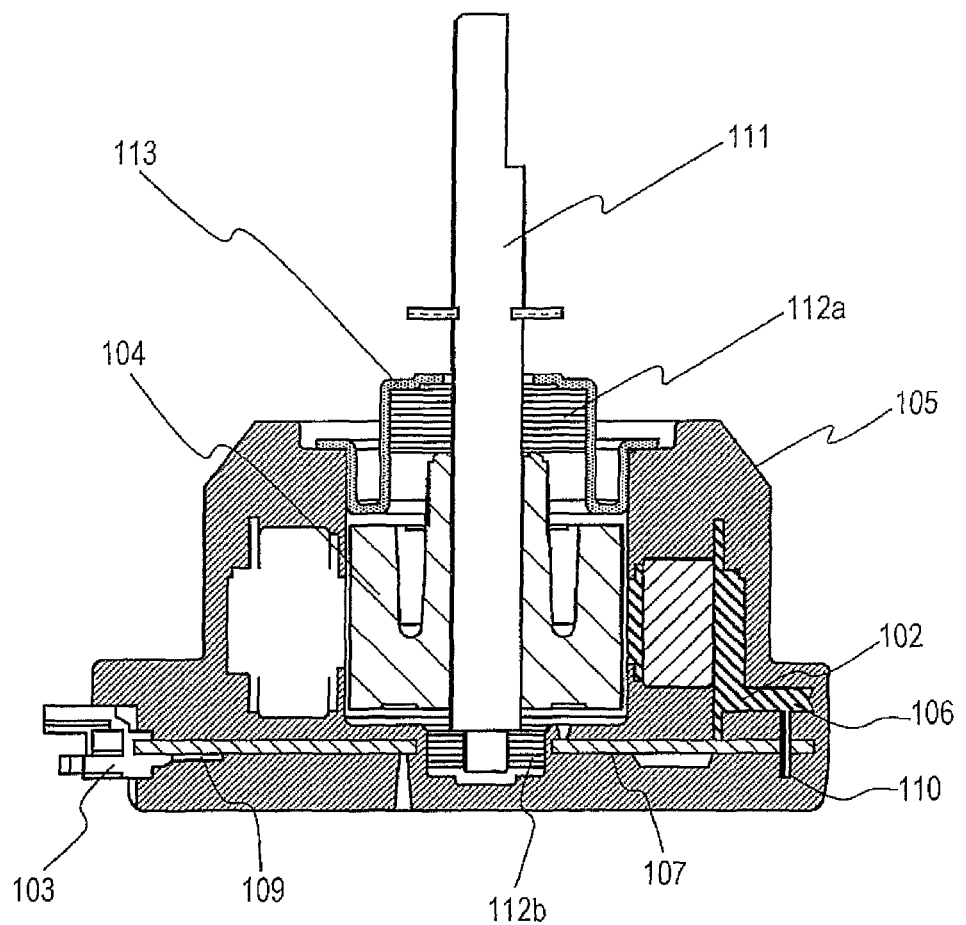
FIG. 17 is a schematic sectional view of the conventional brushless DC motor.

In this state, as illustrated in FIG. 14, upper portions of terminal pins 22 are inserted into the respective holes in driving circuit board 36, and are soldered, and connector terminals 5 are soldered to driving circuit board 36. Connected stator 1 is coated with mold resin to form the outer package of the motor as illustrated in FIG. 15, whereby brushless DC motor 37 is completed.

By holding connector 6 with connector holders 31a, 31b of insulator 3 rather than holding connector 6 with driving circuit board 36, the motor can be configured with or without driving circuit board 36. Further, by dividing the holes for vertically receiving terminal pins 22 into two locations, connection can be made as conventional when the motor includes driving circuit board 36, and terminal pins 22 can be directly connected to respective connector terminals 5 when the motor does not include driving circuit board 36. Thus, the motor can be configured with or without driving circuit board 36.

In the case where the motor includes driving circuit board 36, as illustrated in FIG. 12, three terminal pins 22 are vertically received in connector-neighboring holes 32 in large protruding part 35a and outer peripheral holes 33 in small protruding part 35b near connector holders 31a, 31b. With this configuration, connector terminals 5 do not overlap terminal pins 22, preventing terminal pins 22 from obstructing attachment of connector 6 to facilitate the attachment.

Accordingly, in circuits on driving circuit board 36 in the motor, "feeding power from connector 6", "generating a driving signal", and "feeding power from the motor to terminal pins 22" can be arranged more readily. Moreover, since three terminal pins 22 are vertically received in outer peripheral holes 33 that do not overlap connector-neighboring holes 32 and located close to connector holders 31a, 31b, connector terminals 5 are located close to terminal pins 22 without overlapping. Accordingly, in circuits on driving circuit board 36 in the motor, "feeding power from connector 6", "generating a driving signal", and "feeding power from the motor to terminal pins 22" can be arranged in a small scope.

To vertically receive three terminal pins 22 to connect three-phase winding 8 by soldering, three connector-neighboring holes 32 and three outer peripheral holes 33 are provided in FIG. 12. However, in the case of the single phase motor, to vertically receive two terminal pins 22 to connect two-phase winding 8, two connector-neighboring holes 32 and two outer peripheral holes 33 may be provided.

In the case where the motor includes driving circuit board 36, as illustrated in FIG. 12, the height of connector holders 31a, 31b and the height of the hooked tips of board holders 34a, 34b, 34c are adjusted such that an upper face of driving circuit board 36 is flush with lower faces of connector terminals 5. Accordingly, as illustrated in FIG. 14, connection of driving circuit board 36 and connector terminals 5 by soldering is facilitated.

In the case where the motor includes driving circuit board 36, a large board can be provided using all of board holders 34a, 34b, 34c. In the case of a small board, the board can be held by two board holders 34a, 34b without using board holder 34c.

In this exemplary embodiment, insulator 3 is provided with large protruding part 35a and small protruding part 35b. However, the sizes of the protruding parts are defined for convenience, and the sizes may be reversed or may be the same as long as connection of connector 6 and provision of terminal pins 22 are possible.

By mounting the brushless DC motor in this exemplary embodiment in a ventilator shown in FIG. 7A to FIG. 7C, i.e., a ventilation device, one type of stator structure can be advantageously applied to both the ventilator suitable for a brushless DC motor including the driving circuit board, and the ventilator suitable for a brushless DC motor not including the driving circuit board.

INDUSTRIAL APPLICABILITY

As described above, in the brushless DC motor of the present invention, the winding end can be directly connected to the connector terminal to feed power to the motor without using the wiring board, enabling cost reduction.

Therefore, the brushless DC motor of the present invention can be adopted as a brushless DC motor requiring low costs, and mounted in ventilation devices for households and businesses.

What is claimed is:

1. A brushless DC motor comprising:
a plurality of stacked stator cores;
an insulator configured to form an insulating layer on a surface of the stator cores and to have a protruding part extending from an outer circumference of the stator cores on a same face as one end face of the stator cores in a stacking direction;
a winding wound around the stator cores via the insulator; and
a connector configured to have a plurality of connector terminals that feed power from outside, and to be fixedly held by the protruding part,
wherein at least one of the plurality of connector terminals is connected to a corresponding end of the winding, and
the at least one of the plurality of connector terminals connected to the corresponding end of the winding is bent into an L-shape, and other of the plurality of connector terminals are straight.

2. A brushless DC motor comprising:
a plurality of stacked stator cores;
an insulator configured to form an insulating layer on a surface of the stator cores and to have a protruding part extending from an outer circumference of the stator cores on a same face as one end face of the stator cores in a stacking direction;

a winding wound around the stator cores via the insulator;

a connector configured to have a plurality of connector terminals that feed power from outside, and to be fixedly held by the protruding part; and a board holder configured to protrude in a stacking direction of the stator cores to hold a driving circuit board, wherein the protruding part includes a first protruding part and a second protruding part, wherein at least one of the plurality of connector terminals is connected to a corresponding end of the winding, the first protruding part has a connector holder with a connector-neighboring hole, the second protruding part has an outer peripheral hole configured to vertically receive a terminal pin, the driving circuit board is held by the board holder, and the winding is connected to the terminal pin, the terminal pin is connected to the driving circuit board, and the driving circuit board is connected to the connector.

3. A ventilation device mounted with the brushless DC motor according to claim 1 configured to drive a ventilation fan.

4. A ventilation device mounted with the brushless DC motor according to claim 2 configured to drive a ventilation fan.

5. The brushless DC motor according to claim 1, wherein the protruding part of the insulator has a plurality of connector-neighboring holes and terminal pins are vertically received in the respective connector-neighboring holes.

6. The brushless DC motor according to claim 1, wherein the protruding part of the insulator is provided with a connector holder configured to fixedly hold the connector.

* * * * *